(No Model.)

J. W. BOYNTON.
TAIL STOCK FOR MILLING MACHINES.

No. 491,521. Patented Feb. 14, 1893.

Witnesses:
H. H. Thurston.
S. J. Murphy.

Inventor:
John W. Boynton

UNITED STATES PATENT OFFICE.

JOHN W. BOYNTON, OF PROVIDENCE, RHODE ISLAND, ASSIGNOR TO THE BROWN & SHARPE MANUFACTURING COMPANY, OF SAME PLACE.

TAIL-STOCK FOR MILLING-MACHINES.

SPECIFICATION forming part of Letters Patent No. 491,521, dated February 14, 1893.

Application filed March 4, 1892. Serial No. 423,701. (No model.)

*To all whom it may concern:*

Be it known that I, JOHN W. BOYNTON, of the city and county of Providence, in the State of Rhode Island, have invented certain new and useful Improvements in Tail-Stocks for Milling-Machines; and I do hereby declare the following specification, taken in connection with the accompanying drawings, forming a part of the same, to be a full, clear, and exact description thereof.

My invention has for its object to provide means for readily and accurately effecting all the necessary or desired adjustments of the back center of a milling machine, including not only lateral and vertical but angular adjustments thereof.

To that end the invention consists in the combinations and arrangements of parts hereinafter described.

Figure 1:
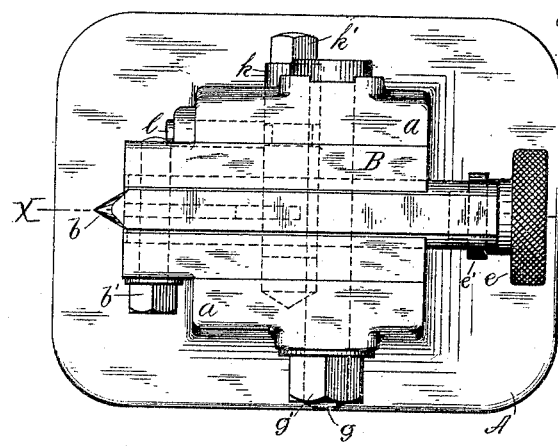
Figure 3:
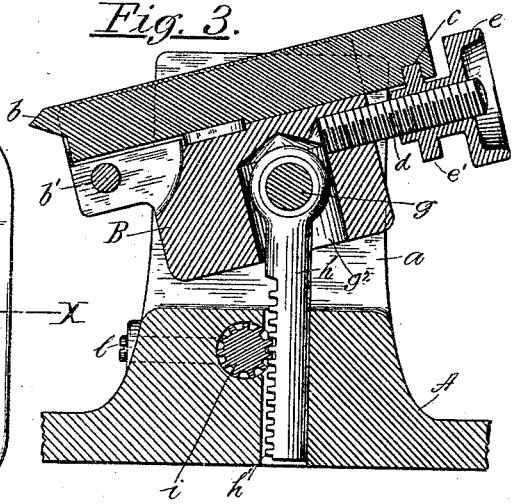
Figure 2:
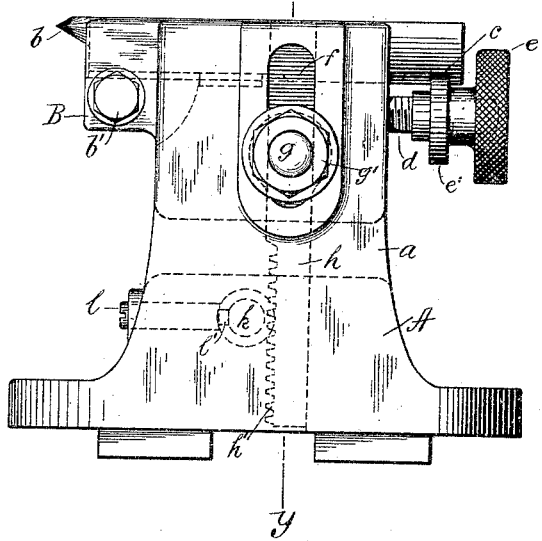
Figure 4:
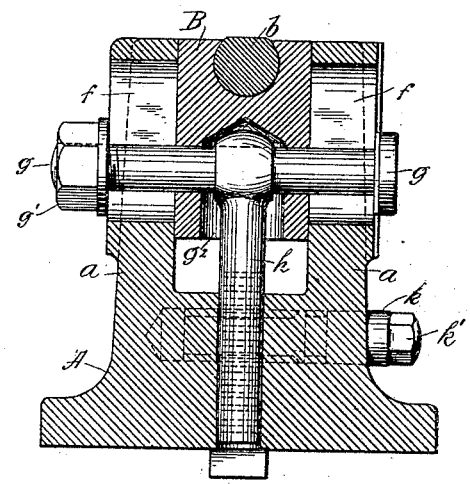

Referring to the drawings, Figure 1 is a top or plan view of a tail stock embodying my invention; Fig. 2 is a side elevation thereof; Fig. 3 is a vertical longitudinal section on the line $x$, $x$, of Fig. 1, with some of the parts in a different adjusted position; and Fig. 4 is a vertical transverse section on line $y$, $y$, of Fig. 2.

A represents the tail stock which is to be arranged to slide upon the carriage of the machine in the usual way. This tail stock is provided with two upwardly extending sides or arms $a$, $a$, between which is fitted the block B carrying the center $b$ arranged to slide therein. At the rear end of the center $b$ a slot $c$ is cut. A screw $d$ is firmly fixed in the block B, to which screw is fitted a thumb-nut $e$ provided with a flange $e'$, which said flange engages the slot $c$ in the center $b$, all as shown in Fig. 3. By this arrangement the center $b$ may be readily adjusted with relation to the block B. A clamp-bolt $b'$ serves to clamp the center $b$ in any adjusted position. Vertical slots $f$, $f$, are formed one in each of the sides $a$. A bolt $g$ passes through these slots and through a transverse hole in the block B, by means of which bolt, and the nut $g'$ thereon, the block B is clamped in position in the tail-stock. Mounted in the body of the tail-stock is an eye-bolt $h$, through the eye at the upper end of which the bolt $g$ passes, the block B being provided with a recess $g^2$ for the end of said eye-bolt, as shown in Fig. 4. The opposite end of this eye-bolt $h$ is provided with rack-teeth $h'$. Engaging with these rack-teeth is a pinion $i$ on a shaft $k$ mounted in the tail-stock. This shaft $k$ is provided with a head $k'$ to which a wrench may be applied. A screw $l$ with a teat $l'$ at its end is mounted in the tail-stock, the teat $l'$ engaging an annular groove in the pinion shaft $k$ to keep the same in position.

By reason of the vertical slots $f$ the block B and the center $b$ may be adjusted vertically with relation to the tail-stock, and such vertical adjustment is readily and accurately effected by means of the rack-bar $h$ and pinion $i$. Furthermore the bolt $g$ serves as a pivot upon which the block B may be readily turned to effect any desired angular adjustment of the block B and center $b$. In making either of these adjustments the nut $g'$ is released, thus unclamping the block B. When the desired adjustments, vertical or angular, or both, have been made the nut $g'$ is set up, thereby firmly clamping the block B between the arms $a$, $a$, and holding said block in the adjusted position. By turning the thumb-nut $e$ the center $b$ may be adjusted laterally in the block B.

By the combination and arrangement of parts above described, the center $b$ may be readily and accurately adjusted in all required directions laterally, vertically and angularly, and be held in any adjusted position.

What I claim as my invention and desire to secure by Letters Patent is:

The combination, with a tail-stock provided with upwardly extending arms having vertical slots therein, of a block arranged to slide between said arms, said block carrying a center adjustable therein, a clamp-bolt passing through said block and the slots in the arms of the tail-stock, an eye-bolt through the eye of which said clamp-bolt passes, said eye-bolt being provided at its other end with rack-teeth, and a shaft mounted in the tail-stock, said shaft carrying a pinion engaging the rack-teeth upon said eye-bolt, substantially as described.

JOHN W. BOYNTON.

Witnesses:
W. H. THURSTON,
S. J. MURPHY.